(12) United States Patent
Drader et al.

(10) Patent No.: US 7,103,432 B2
(45) Date of Patent: Sep. 5, 2006

(54) AUTO-CONFIGURATION OF HARDWARE ON A PORTABLE COMPUTING DEVICE

(75) Inventors: Marc A. Drader, Kitchener (CA); James Robinson, Elmira (CA); Jerry Eugene Mailloux, Waterloo (CA)

(73) Assignee: Research In Motion Limited, Waterloo (CA)

( * ) Notice: Subject to any disclaimer, the term of this patent is extended or adjusted under 35 U.S.C. 154(b) by 5 days.

(21) Appl. No.: 10/858,059

(22) Filed: Jun. 2, 2004

(65) Prior Publication Data

US 2005/0273189 A1    Dec. 8, 2005

(51) Int. Cl.
*G06F 19/00* (2006.01)
(52) U.S. Cl. .................. 700/95; 700/94; 361/683; 710/10; 713/2
(58) Field of Classification Search .............. 700/94, 700/95; 361/683; 710/10, 302; 709/220; 713/2, 310
See application file for complete search history.

(56) References Cited

U.S. PATENT DOCUMENTS

| | | | | |
|---|---|---|---|---|
| 4,775,928 | A | * | 10/1988 | Kendall et al. ............. 713/310 |
| 5,771,028 | A | * | 6/1998 | Dalton et al. ................ 345/3.2 |
| 5,867,730 | A | * | 2/1999 | Leyda ......................... 710/10 |
| 6,421,235 | B1 | * | 7/2002 | Ditzik ......................... 361/683 |
| 6,725,260 | B1 | * | 4/2004 | Philyaw ....................... 709/220 |
| 6,847,916 | B1 | * | 1/2005 | Ying ........................... 702/183 |
| 6,865,400 | B1 | * | 3/2005 | Oh et al. ................. 455/556.2 |
| 2003/0160771 | A1 | | 8/2003 | Fraser et al. |

OTHER PUBLICATIONS

XP-002311656—"Display Monitor Detection and Self Configuration for Personal Computer", IBM Technical Disclosure Bulletin, vol. 30, No. 1, pp. 352-353 (Jun. 01, 1987).

* cited by examiner

*Primary Examiner*—Jayprakash N. Gandhi
*Assistant Examiner*—Sheela S. Rao
(74) *Attorney, Agent, or Firm*—Heenan Blaikie LLP (57) ABSTRACT

A method of manufacturing a portable computing device, involves the steps of (1) maintaining a table comprising stimulus/response data for possible hardware components that may be interfaced in the computing device; (2) performing one manufacturing step in the manufacture of the portable computing device by interfacing one of the possible hardware components with one other component of the computing device; and (3) performing one other manufacturing step in the manufacture by: (i) applying a stimulus to the interfaced hardware component, and reading a response from the interfaced hardware component in response to the applied stimulus; (ii) identifying the interfaced hardware component from a correlation of the response with the stimulus/response data; and (iii) saving the identification as configuration data in the computing device.

20 Claims, 5 Drawing Sheets

AUTO-CONFIGURATION OF HARDWARE ON A PORTABLE COMPUTING DEVICE

FIELD OF THE INVENTION

The invention described herein relates to a mechanism for manufacturing a portable computing device. In particular, the invention described herein relates to a method for manufacturing a portable computing device using hardware components sourced from different manufacturers.

BACKGROUND OF THE INVENTION

The conventional portable computing device, such as laptop computer, a PDA, or a wireless telephone, includes a LCD display for presenting information to the user, and a keyboard or keypad for facilitating data entry by the user. The LCD display might be a transmissive LCD panel, a reflective LCD panel or a transreflective LCD panel, and might be sourced from any of a number of different manufacturers.

Each make and model of LCD panel typically has its own particular instructions set and signal timing characteristics. As such, the portable computing device manufacturer must maintain a number of device drivers for all of the LCD panels that the manufacturer might use during fabrication of the portable computing device. Further, during the fabrication process, technicians must manually identify the make and model of the LCD panel, and then configure the portable computing device with the correct device driver. Alternately, the manufacturer must ensure that the correct device driver for the LCD panel will be loaded onto the computing device. This method of manufacture is time consuming, error prone and labour intensive, and therefore, also increases the manufacturing cost of the portable computing device.

Therefore, there is a need for a method of manufacturing a portable computing device in which the manufacturer may select from one of a number of functionally-similar hardware components (eg. LCD panels) at any given time in the assembly process, but which may have different instruction set and/or signal timing characteristics.

SUMMARY OF THE INVENTION

According to the invention described herein, in a manufacturing process in which a manufacturer manufacturers a portable computing device by selecting from one of a number of functionally-similar but possibly electrically-different hardware components, the assembled portable computing device auto-configures by electronically identifying the hardware component installed in the computing device at the time the portable computing device is manufactured.

According to one aspect of the invention described herein, there is provided a method of manufacturing a portable computing device, that involves the steps of (1) maintaining a table comprising stimulus/response data for possible hardware components that may be interfaced in the computing device; (2) performing one manufacturing step in the manufacture of the portable computing device by interfacing one of the possible hardware components with one other component of the computing device; and (3) performing one other manufacturing step in the manufacture by: (i) applying a stimulus to the interfaced hardware component, and reading a response from the interfaced hardware component in response to the applied stimulus; (ii) identifying the interfaced hardware component from a correlation of the response with the stimulus/response data; and (iii) saving the identification as configuration data in the computing device.

According to another aspect of the invention described herein, there is provided a portable computing device that includes:

a table comprising stimulus/response data for possible hardware components that may be interfaced with the computing device; and data processing means in communication with the table, the data processing means being configured for performing the following steps upon interfacing one of the possible hardware components with one other component of the computing device and initial power-up of the portable computing device:

(1) applying a stimulus to the interfaced hardware component, and reading a response from the interfaced hardware component in response to the applied stimulus;

(2) identifying the interfaced hardware component from a correlation of the response with the stimulus/response data; and (3) saving the identification as configuration data in the computing device.

BRIEF DESCRIPTION OF THE DRAWINGS

The invention will now be described, by way of example only, with reference to the accompanying drawings, in which.

DETAILED DESCRIPTION OF THE PREFERRED EMBODIMENT

Figure 1:
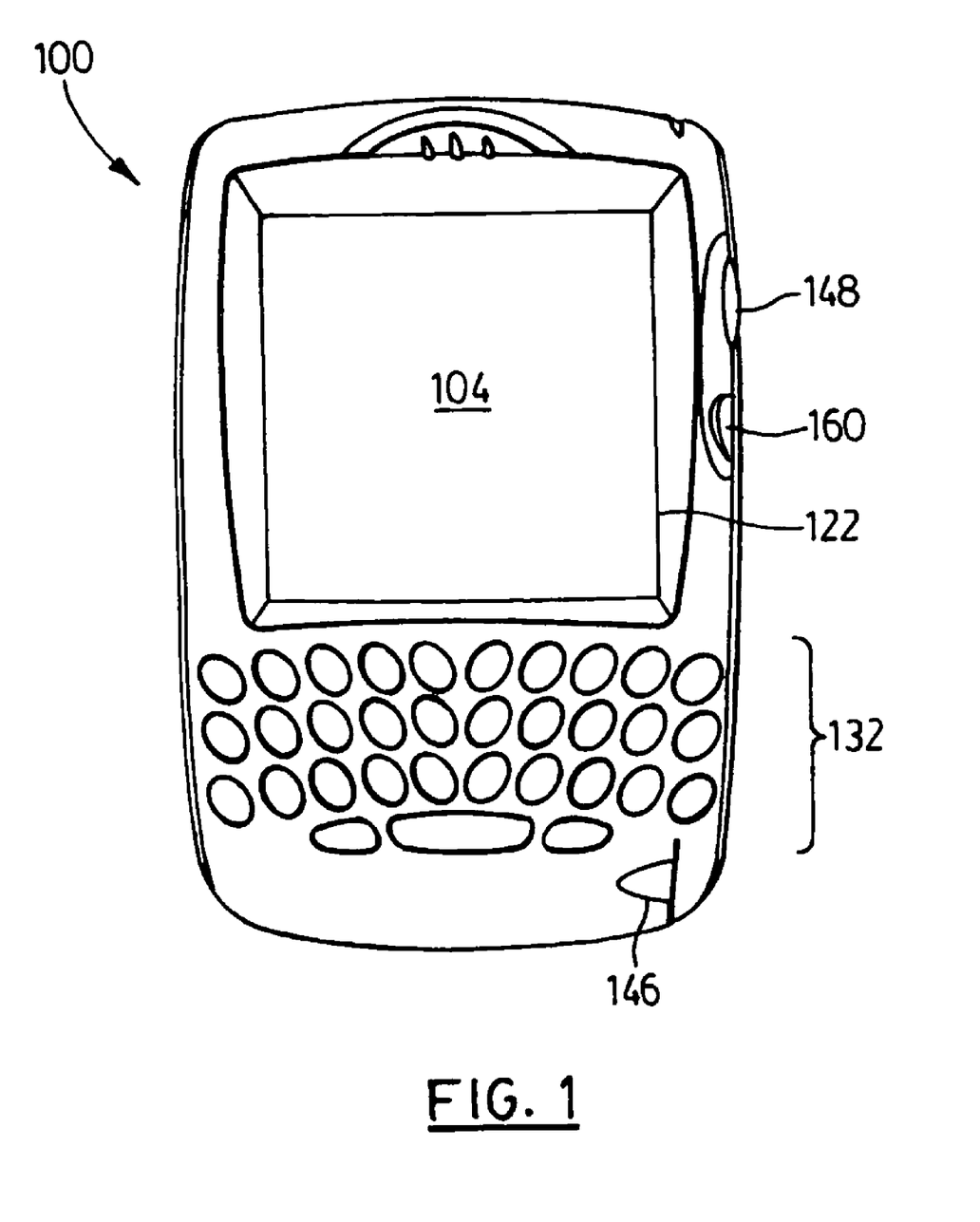
FIG. 1 is a front plan view of a handheld computing device, according the invention described herein.

Referring now to FIG. 1, there is shown a handheld computing device, denoted generally as 100, provided according to one aspect of the invention. The handheld computing device 100 includes a display 122, a function key 146, and data processing means 102 (not shown) disposed within a common housing. In one the embodiment, the display 122 comprises a reflective or trans-reflective LCD display, and the function key 146 operates as a backlight switch. Alternately, in another embodiment, the display 122 comprises a transmissive LCD display, and the function key 146 operates as a power on/off switch.

As will be described, the data processing means comprises a microprocessor 138, and a memory 124, 126 (disposed within the housing). The memory 124, 126 carries computer processing instructions which, when accessed from the memory 124, 126 and executed by the microprocessor 138, cause the data processing means to perform the method which will be described in further detail below.

In addition to the display 122 and the function key 146, the handheld computing device 100 includes user data input means for inputting data to the data processing means. Further, the data processing means 102 is in communication with the user data input means. As shown, preferably the user data input means includes a keyboard 132, a thumbwheel 148 and an escape key 160.

During the manufacturing process of the handheld computing device 100, depending upon part availability, the manufacturer of the handheld computing device 100 might select from one of a number of functionally-similar hardware components. For instance, the manufacturer might select from one of a number of types of LCD displays 122, or other non-standardized hardware components (such melody ICs). However, since the manufacturer of the handheld computing device 100 might source the hardware components from a number of different part suppliers, and since a particular part supplier might supply different versions/models of the same hardware component, the hardware components might be electrically-incompatible. For instance, the pulse widths and timing requirements of the signals may differ between the various LCD displays 122.

Typically, the handheld computing device 100 is a two-way wireless communication device having at least voice and data communication capabilities. Further, preferably the handheld computing device 100 has the capability to communicate with other computer systems on the Internet. Depending on the exact functionality provided, the wireless handheld computing device 100 may be referred to as a data messaging device, a two-way pager, a wireless e-mail device, a cellular telephone with data messaging capabilities, a wireless Internet appliance, or a data communication device, as examples.

Figure 2:
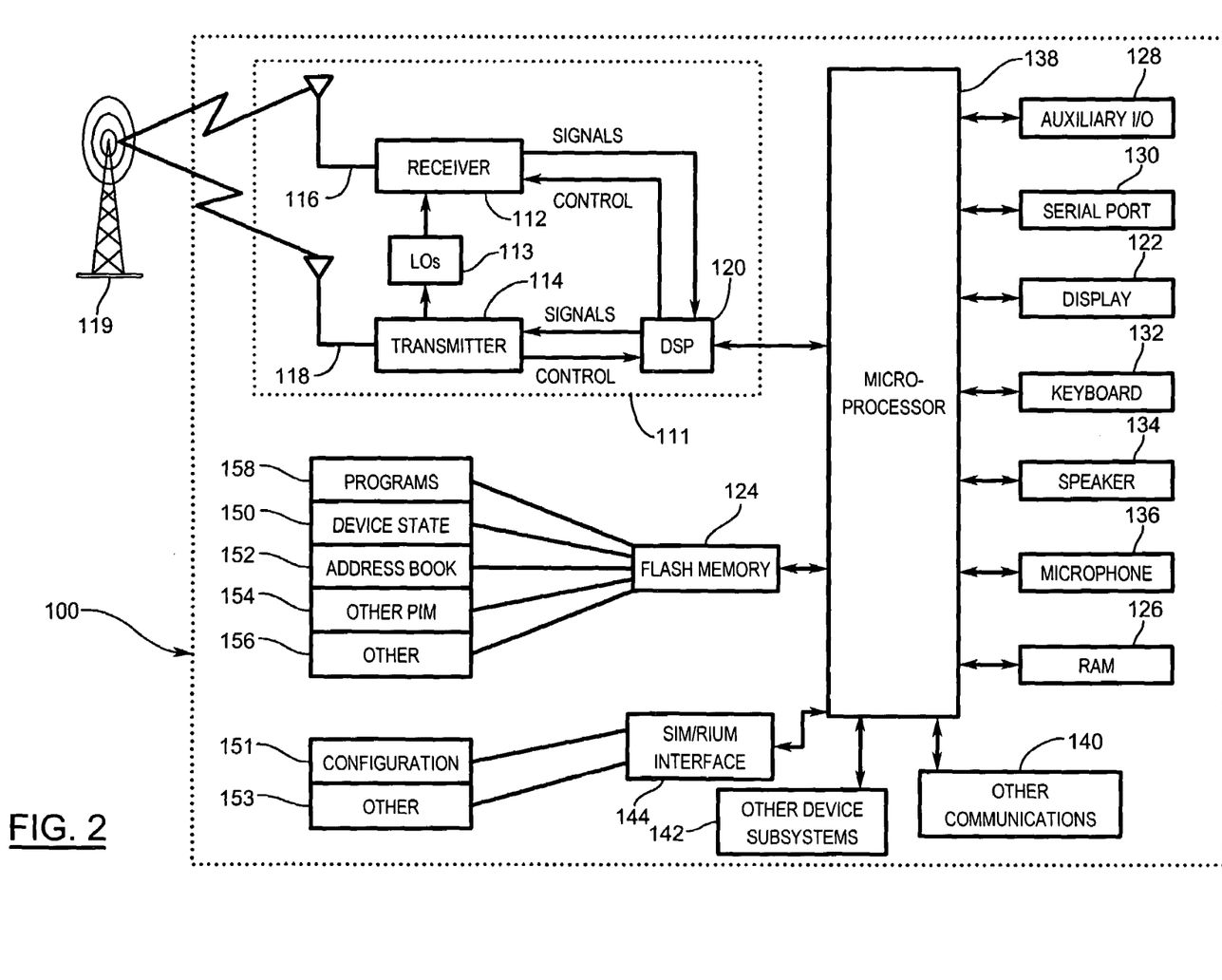
FIG. 2 is a schematic view depicting functional details of the handheld computing device

FIG. 2 depicts functional details of the handheld computing device 100. Where the handheld computing device 100 is enabled for two-way communication, it will incorporate a communication subsystem 111, including both a receiver 112 and a transmitter 114, as well as associated components such as one or more, preferably embedded or internal, antenna elements 116 and 118, local oscillators (LOs) 113, and a processing module such as a digital signal processor (DSP) 120. As will be apparent to those skilled in the field of communications, the particular design of the communication subsystem 111 will be dependent upon the communication network in which the device is intended to operate. For example, the handheld computing device 100 may include a communication subsystem 111 designed to operate within the Mobitex™ mobile communication system, the DataTAC™ mobile communication system, GPRS network, UMTS network, EDGE network or CDMA network.

Network access requirements will also vary depending upon the type of network 119. For example, in the Mobitex and DataTAC networks, the handheld computing device 100 is registered on the network using a unique identification number associated with each handheld computing device. In UMTS and GPRS networks, and in some CDMA networks, however, network access is associated with a subscriber or user of the handheld computing device 100. A GPRS handheld computing device therefore requires a subscriber identity module (SIM) card in order to operate on a GPRS network, and a RUIM in order to operate on some CDMA networks. Without a valid SIM/RUIM card, a GPRS/UMTS/CDMA handheld computing device may not be fully functional. Local or non-network communication functions, as well as legally required functions (if any) such as "911" emergency calling, may be available, but the handheld computing device 100 will be unable to carry out any other functions involving communications over the network. The SIM/RUIM interface 144 is normally similar to a card-slot into which a SIM/RUIM card can be inserted and ejected like a diskette or PCMCIA card. The SIM/RUIM card can have approximately 64K of memory and hold many key configuration 151, and other information 153 such as identification, and subscriber related information.

When required network registration or activation methods have been completed, the handheld computing device 100 may send and receive communication signals over the network 119. Signals received by antenna 116 through communication network 119 are input to receiver 112, which may perform such common receiver functions as signal amplification, frequency down conversion, filtering, channel selection and the like, and in the example system shown in FIG. 2, analog to digital (A/D) conversion. A/D conversion of a received signal allows more complex communication functions such as demodulation and decoding to be performed in the DSP 120. In a similar manner, signals to be transmitted are processed, including modulation and encoding for example, by DSP 120 and input to transmitter 114 for digital to analog conversion, frequency up conversion, filtering, amplification and transmission over the communication network 119 via antenna 118. DSP 120 not only processes communication signals, but also provides for receiver and transmitter control. For example, the gains applied to communication signals in receiver 112 and transmitter 114 may be adaptively controlled through automatic gain control algorithms implemented in DSP 120.

The handheld computing device 100 preferably includes a microprocessor 138 which controls the overall operation of the device. Communication functions, including at least data and voice communications, are performed through communication subsystem 111. Microprocessor 138 also interacts with further device subsystems such as the display 122, flash memory 124, random access memory (RAM) 126, auxiliary input/output (I/O) subsystems 128, serial port 130, keyboard 132, speaker 134, microphone 136, a short-range communications subsystem 140 and any other device subsystems generally designated as 142.

Some of the subsystems shown in FIG. 2 perform communication-related functions, whereas other subsystems may provide "resident" or on-device functions. Notably, some subsystems, such as keyboard 132 and display 122, for example, may be used for both communication-related functions, such as entering a text message for transmission over a communication network, and device-resident functions such as a calculator or task list.

Operating system software used by the microprocessor 138 is preferably stored in a persistent store such as flash memory 124, which may instead be a read-only memory (ROM) or similar storage element (not shown). Those skilled in the art will appreciate that the operating system, specific device applications, or parts thereof, may be temporarily loaded into a volatile memory such as RAM 126. The operating system software comprises computer processing instructions which, when accessed from the flash memory 124 and the RAM 126 and executed by the microprocessor 138, define the aforementioned data processing means 102. Received communication signals may also be stored in RAM 126.

As shown, the flash memory 124 can be segregated into different areas for both computer programs 158 and program data storage 150, 152, 154 and 156. These different storage areas indicate that each program can allocate a portion of flash memory 124 for their own data storage requirements. Preferably, one of the program data storage areas 150, 152, 154, 156 maintains a table that includes stimulus and response data for the possible hardware components that may be interfaced with the handheld computing device 100. In particular, preferably one of the program data storage areas 150, 152, 154, 156 maintains a table that includes stimulus and response data for the possible LCD displays 122 that could be installed on the handheld computing device 100.

Microprocessor 138, in addition to its operating system functions, preferably enables execution of software applications on the handheld computing device. A predetermined set of applications that control basic operations, will normally be installed on the handheld computing device 100 during manufacturing.

One such set of software applications comprise device drivers for the various possible hardware components that may be interfaced with the handheld computing device 100. For instance, preferably one set of the software applications comprise device drivers for each of the possible LCD displays 122 that could be installed on the handheld computing device 100. Another set of software applications might perform data and/or voice communication functions, for example.

A preferred software application may be a personal information manager (PIM) application having the ability to organize and manage data items relating to the user of the handheld computing device such as, but not limited to, e-mail, calendar events, voice mails, appointments, and task items. Naturally, one or more memory stores would be available on the handheld computing device to facilitate storage of PIM data items. Such PIM application would preferably have the ability to send and receive data items, via the wireless network 119. In a preferred embodiment, the PIM data items are seamlessly integrated, synchronized and updated, via the wireless network 119, with the user's corresponding data items stored or associated with a host computer system. Further applications may also be loaded onto the handheld computing device 100 through the network 119, an auxiliary I/O subsystem 128, serial port 130, short-range communications subsystem 140 or any other suitable subsystem 142, and installed by a user in the RAM 126 or preferably a non-volatile store (not shown) for execution by the microprocessor 138. Such flexibility in application installation increases the functionality of the device and may provide enhanced on-device functions, communication-related functions, or both. For example, secure communication applications may enable electronic commerce functions and other such financial transactions to be performed using the handheld computing device 100.

In a data communication mode, a received signal such as a text message or web page download will be processed by the communication subsystem 111 and input to the microprocessor 138, which preferably further processes the received signal for output to the display 122, or alternatively to an auxiliary I/O device 128. A user of the handheld computing device 100 may also compose data items such as email messages for example, using the keyboard 132, which is preferably a complete alphanumeric keyboard or telephone-type keypad, in conjunction with the display 122 and possibly an auxiliary I/O device 128. Such composed items may then be transmitted over a communication network through the communication subsystem 111.

For voice communications, overall operation of the handheld computing device 100 is similar, except that received signals would preferably be output to a speaker 134 and signals for transmission would be generated by a microphone 136. Alternative voice or audio I/O subsystems, such as a voice message recording subsystem, may also be implemented on the handheld computing device 100. Although voice or audio signal output is preferably accomplished primarily through the speaker 134, display 122 may also be used to provide an indication of the identity of a calling party, the duration of a voice call, or other voice call related information for example.

Serial port 130 in FIG. 2, would normally be implemented in a personal digital assistant (PDA)-type handheld computing device for which synchronization with a user's desktop computer (not shown) may be desirable, but is an optional device component. Such a port 130 would enable a user to set preferences through an external device or software application and would extend the capabilities of the handheld computing device 100 by providing for information or software downloads to the handheld computing device 100 other than through a wireless communication network. The alternate download path may for example be used to load an encryption key onto the device through a direct and thus reliable and trusted connection to thereby enable secure device communication.

Other communications subsystems 140, such as a short-range communications subsystem, is a further optional component which may provide for communication between the handheld computing device 100 and different systems or devices, which need not necessarily be similar devices. For example, the subsystem 140 may include an infrared device and associated circuits and components or a Bluetooth™ communication module to provide for communication with similarly enabled systems and devices.

Figure 3:
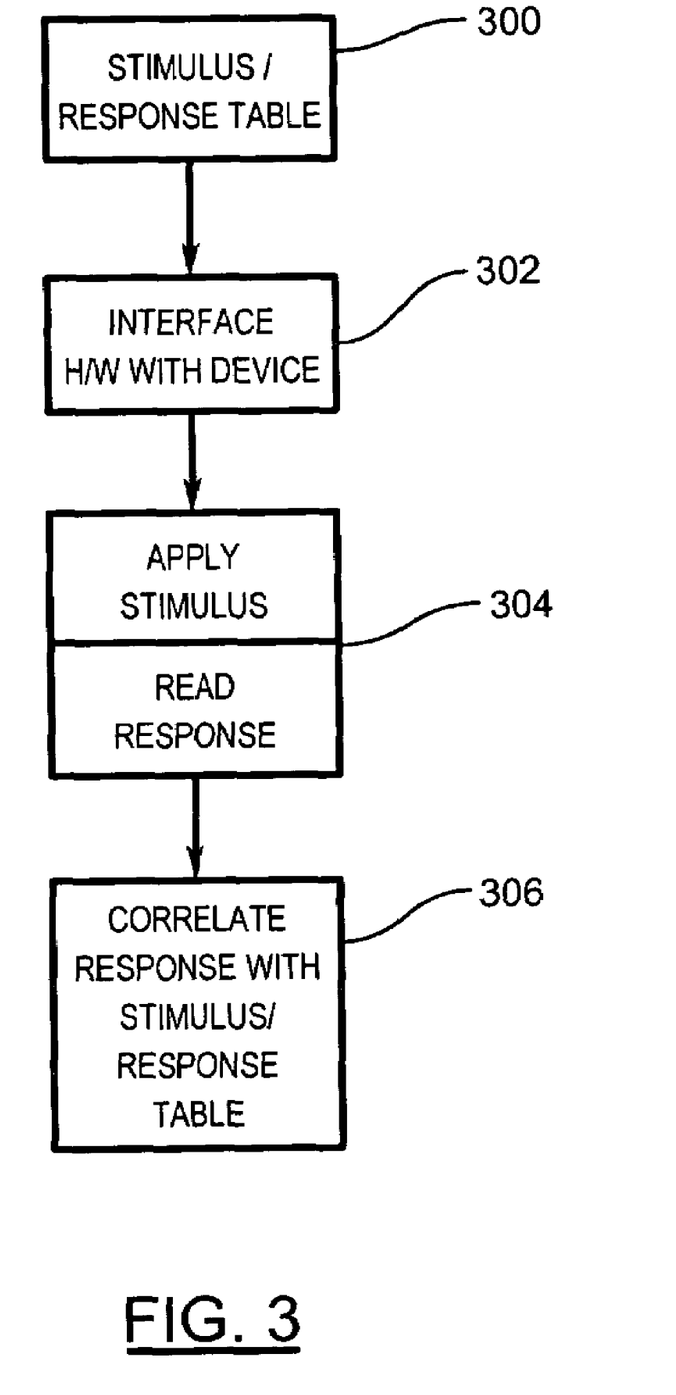
FIG. 3 is a flowchart depicting, by way of overview, the method of identifying hardware installed in the handheld computing device.

FIG. 3 is a flow chart that depicts, by way of overview, the sequence of steps performed during the manufacturing process of the handheld computing device 100 according to the invention. Initially, at step 300, a table is created that comprises stimulus and response data for possible hardware components that may be interfaced with the computing device 100. As discussed above, preferably the table is maintained in one of the program data storage areas 150, 152, 154, 156, and includes stimulus and response data for the possible LCD displays 122 that could be installed on the handheld computing device 100. However, the table may also be maintained externally to the handheld computing device 100. Further, the table may include stimulus and response data for hardware components other than, or in addition to, the possible LCD displays 122.

At step 302, one of the possible hardware components (eg. one of the possible LCD displays 122) is interfaced with one other component (eg. an edge connector) of the handheld computing device 100.

Subsequently, at step 304, the manufacturing process continues when a stimulus signal is applied to the interfaced hardware component, and a response signal is read from the interfaced hardware component in response to the applied stimulus. Preferably, the data processing means 102 of the handheld computing device 100 causes the stimulus signal to be applied the interfaced hardware component, and also reads the response from the interfaced hardware component.

Then, at step 306, the interfaced hardware component is identified by correlating the response received from the interface hardware component with the stimulus and response data in the stimulus and response table. Preferably, the data processing means 102 of the handheld computing device 100 identifies the interfaced hardware component by comparing the response received from the interface hardware component against the response data in the stimulus and response table. If the component cannot be identified from the response received at step 304, processing continues at step 304 using a different type of stimulus. Steps 304 and 306 are repeated until the component is positively identified.

Figure 4A:
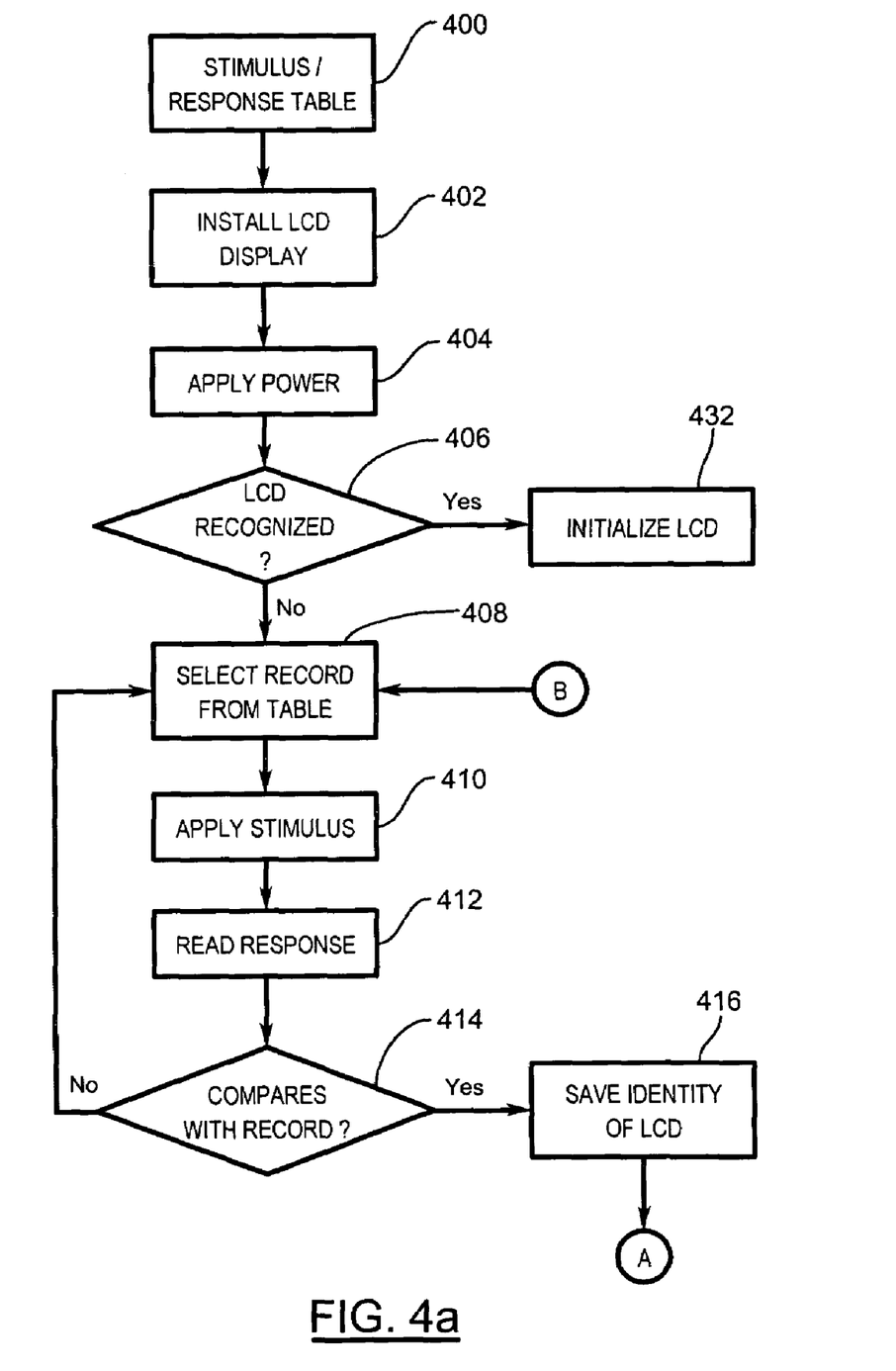
FIGS. 4*a* and 4*b* together comprise a flowchart depicting, in detail, the method of identifying and configuring the LCD display installed in the handheld computing device.
Figure 4B:
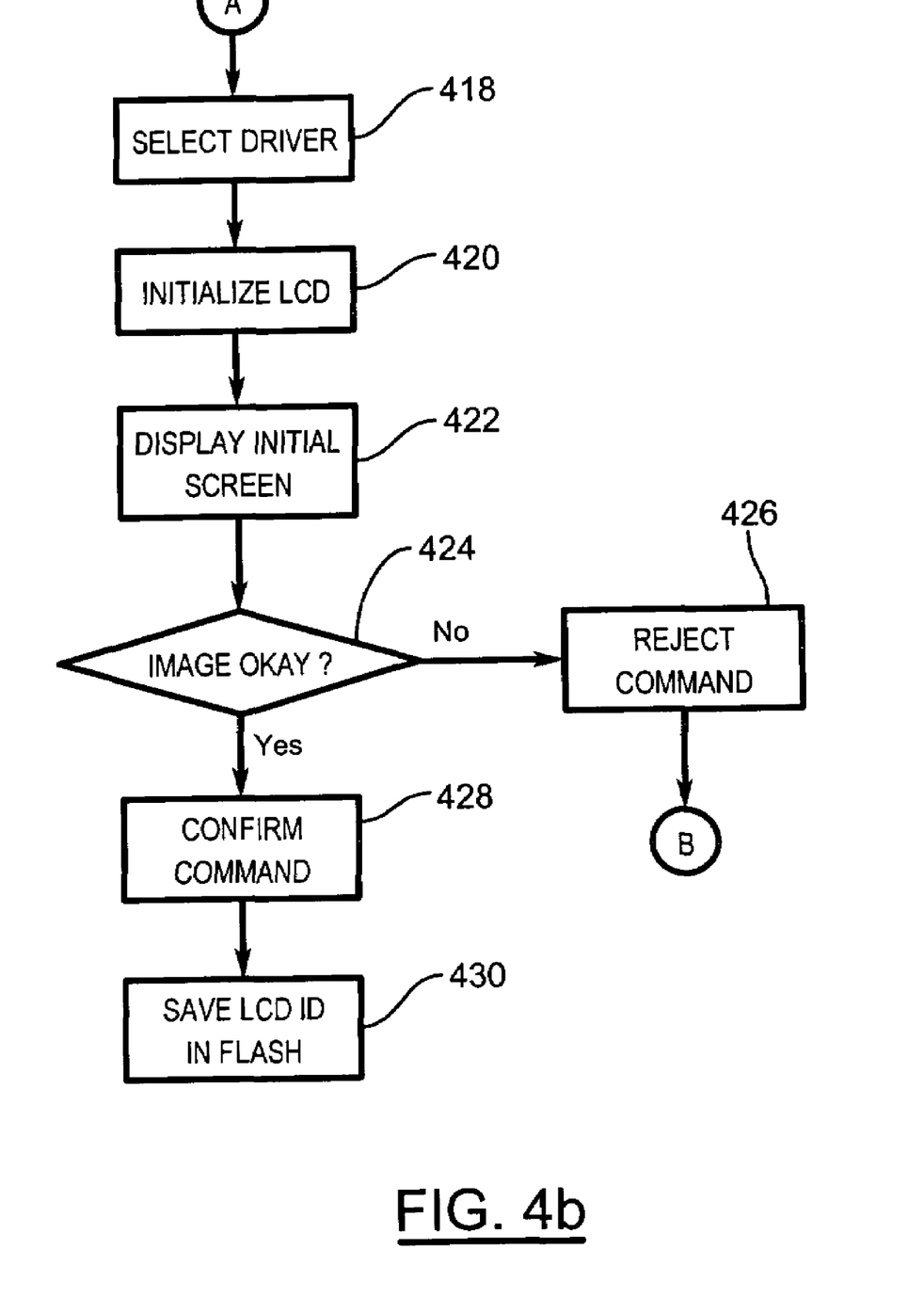

FIG. 4 is a flow chart that depicts, in detail, the sequence of steps performed during the manufacturing process of the handheld computing device 100 according to the invention.

Initially, at step 400, a stimulus/response table is maintained for the possible hardware devices that could be installed on the handheld computing device 100. For ease of understanding, the following discussion assumes that the stimulus/response table is maintained in one of the program data storage areas 150, 152, 154, 156 of the handheld computing device 100 for all of the possible LCD displays 122 that the manufacturer might install in the handheld computing device 100.

The stimulus/response table includes a number of data records, each associated with one of the possible LCD displays 122. Typically, each data record includes a record identifier, instruction set data, and timing and pulse width data for the associated LCD display 122. Preferably, the record identifier is uniquely associated with the LCD display 122, and identifies the device driver for the LCD display 122.

In addition, each record identifies stimulus signals to be applied to the LCD display 122, response signals that the LCD display 122 should generate in response to the stimulus signals (if the LCD display 122 associated with the instruction set, and the timing and pulse width data is the LCD display 122 installed in the handheld computing device 100).

Ideally, the stimulus signals should be selected so that the response signals received uniquely identify the LCD display 122. Further, the stimulus signals should be selected so that the stimulus signals will not adversely effect the LCD display 122 installed in the handheld computing device 100. For instance, a set of stimulus signals may cause the LCD display 122 for which the stimulus signals are intended to provide a unique response. However, the same stimulus signals, when applied to a different LCD display 122, may cause the LCD display 122 to enter an unknown state which may damage the LCD display 122. Accordingly, the stimulus signals should be selected to avoid this possibility.

At step 402, the LCD display 122 is installed in the handheld computing device 100 at the appropriate stage of the manufacturing process. Typically, each LCD display 122 includes an electrical edge connector, the motherboard of the handheld computing device 100 includes an electrical connector suitable for interfacing with the edge connector of all the possible LCD displays 122, and the LCD display 122 is installed in the handheld computing device 100 by interfacing the edge connector of the LCD display 122 with the motherboard LCD connector.

After the assembly of the handheld computing device 100 is completed, power is applied to the handheld computing device 100 in the next or a subsequent stage of the manufacturing process, at step 404.

After the data processing means 102 has powered-up, at step 406 the data processing means 102 checks one of the program data storage areas 150, 152, 154, 156 to determine whether the data processing means 102 has already identified the LCD display 122. As will be explained, after the LCD display 122 has been properly identified, the data processing means 102 saves in one of the program data storage areas 150, 152, 154, 156 the record identifier that is uniquely associated with the LCD display 122. The data processing means 102 subsequently uses the record identifier to determine the appropriate device driver to use when communicating with the LCD display 122.

Accordingly, if the data processing means 102 locates a record identifier in the appropriate program data storage area 150, 152, 154, 156 at step 406, the data processing means 102 proceeds to step 432 where the LCD display 122 is initialized using the device driver associated with the record identifier. Otherwise, the data processing means 102 assumes that the LCD display 122 has not yet been identified and, therefore, proceeds to step 408.

At step 408, the data processing means 102 selects one of the data records from the stimulus/response table. The selected data record is associated with one of the possible LCD displays 122 that the manufacturer might have installed in the handheld computing device 100. At step 410, the data processing means 102 reads the selected data record, and then applies stimulus signals to the LCD display 122 based on the pulse-width data, signal timing data, and stimulus data identified in the selected data record. As will be apparent, the data processing means 102 applies the stimulus signals to the LCD display 122 via the motherboard LCD connector.

At step 412, the data processing means 102 reads the response it receives from the LCD display 102, over the motherboard LCD connector. As will be appreciated, the data processing means 102 uses the pulse-width data and signal timing data identified in the selected data record to properly read the response.

At step 414, the data processing means 102 compares the response it received from the LCD display 102 against the response data identified in the selected data record. If the response that the data processing means 102 received from the LCD display 102 does not match the response data identified in the selected data record, the data processing means 102 assumes that the LCD display 102 has not been correctly identified. Accordingly, processing returns to step 408, where the data processing means 102 selects another one of the data records from the stimulus/response table.

Alternately, however, if the response that the data processing means 102 received from the LCD display 102 matches the response data identified in the selected data record, the data processing means 102 assumes that the LCD display 102 has been correctly identified. Accordingly, at step 416, the data processing means 102 saves the unique identifier for the selected data record in the RAM 126. Processing then proceeds to step 418.

At step 418, the data processing means 102 uses the unique identifier stored in the RAM 126 to select the correct device driver for the LCD display 122. The data processing means 102 then uses the device driver to initialize the LCD display 122, at step 420. Then, at step 422, the data processing means 102 commands the operating system to generate an initial display screen on the LCD display 122.

At step 424, a video capture system visually compares the initial screen that is displayed on the LCD display 122 against an expected image. If the video capture system determines that the initial displayed screen does not match the expected image, at step 426 the video capture system issues a rejection command notifying the data processing means 102 that the LCD display 122 has not been correctly identified. Processing then returns to step 408, where the data processing means 102 selects another one of the data records from the stimulus/response table.

If the video capture system determines at step 424 that the initial displayed screen matches the expected image, at step 428 the video capture system issues a confirmation command notifying the data processing means 102 that the LCD display 122 has been correctly identified. The data processing means 102 then saves the unique identifier in the appropriate program data storage area 150, 152, 154, 156, at step 430. As will be apparent, steps 424 to 428 can be performed manually, by a technician, although doing so may introduce errors into the identification process.

As discussed above, ideally the stimulus signals should be selected so that the response signals received uniquely identify the LCD display 122. However, this might not be possible. Further, even if each of the response signals do uniquely identify the LCD display 122, it is possible that the stimulus signals, when applied to the wrong LCD display 122, might place the LCD display 122 into a random unknown state in which the LCD display 122 generates response signals corresponding to the response data identified in the selected data record. Accordingly, steps 416 to 428 are not essential, but instead are used to increase the accuracy of the identification process.

As discussed above, when the handheld computing device 100 is subsequently powered-up, the data processing means 102 uses the unique identifier stored in the program data storage area 150, 152, 154, 156 to determine that the LCD display 122 has already been identified, so that no further identification attempts are necessary. However, since the handheld computing device 100 may subsequently require repair (involving, for example, replacement of the existing LCD display 122 with a different LCD display 122), preferably the operating system of the handheld computing device 100 is configured with a command sequence that causes the unique identifier to be erased from the program data storage area 150, 152, 154, 156 so that the data processing means 102 will perform steps 408 to 430 upon completion of the repair.

Modifications to the foregoing process are contemplated. For instance, in one variation the data records identify a memory address for the RAM area of the LCD display 122. In this variation, instead of applying reset stimulus signals to the LCD display 122, the data processing means 102 applies a write stimulus signal to the LCD display 122 that causes a unique data string to be written into the identified memory location. The data processing means 102 reads back the string from the same memory location. If the string read back from the LCD display 122 matches the string written to the LCD display 122, the data processing means 102 would assume that it has correctly identified the LCD display 122.

In another variation, the data records identify the location and contents of one or more registers that are in a known state when power is applied to the LCD display 122. In this variation, the data processing means 102 applies a read stimulus signal to the LCD display 122 that causes the register values to be read from these registers. If the values read from these registers match their expected values, the data processing means 102 would assume that it has correctly identified the LCD display 122.

In another variation, the data records identify the contents of non-volatile memory (eg. EEPROM) on the LCD display 122 that identify, for example, a date code or model code of the LCD display 122. Alternately, the data records may identify service inputs/outputs that identify the model/version of the LCD display 122. In this variation, the data processing means 102 applies the appropriate stimulus signal to the LCD display 122 so as to read the date code, model code, or version data from the LCD display 122.

As will be apparent, one or more of these variants may be used in addition to, or instead of, the method described in steps 400 to 428. For instance, if the data processing means 102 is unable to identify the LCD display 122 using the reset stimulus signals, the data processing means 102 could apply the stimulus signals described in any or all of the foregoing variants.

The present invention is defined by the claims appended hereto, with the foregoing description being merely illustrative of a preferred embodiment of the invention. Those of ordinary skill may envisage certain modifications to the foregoing embodiments which, although not explicitly discussed herein, do not depart from the scope of the invention, as defined by the appended claims.

We claim:

1. A method of manufacturing a portable computing device, comprising the steps of:
   (1) maintaining a table comprising stimulus and response data for possible hardware components that may be interfaced with the computing device;
   (2) performing one manufacturing step in the manufacture of the portable computing device by interfacing one of the possible hardware components with one other component of the computing device, the interfaced hardware component comprising a display device; and
   (3) performing one other manufacturing step in the manufacture by:
      (i) applying a stimulus to the interfaced hardware component, and reading a response from the interfaced hardware component in response to the applied stimulus; and
      (ii) identifying the interfaced hardware component from a correlation of the response with the stimulus and response data.

2. The method according to claim 1, wherein:
   the table includes a plurality of records, each said record being associated with a respective one of the possible hardware components and defining pin-out data and the stimulus and response data for the associated hardware component;
   the applying step comprises the steps of:
      (a) selecting one of the possible hardware components,
      (b) applying the stimulus in accordance with the pin-out and stimulus data associated with the selected one hardware component, and
      (c) reading the response in accordance with the pin-out information associated with the selected one hardware component; and
   the correlation step comprises comparing the read response against the response data associated with the selected hardware component.

3. The method according to claim 2, wherein the performing one other manufacturing step comprises performing the one other manufacturing step upon initial power-up of the portable computing device.

4. The method according to claim 3, wherein the step of applying the stimulus in accordance with the pin-out and stimulus data comprises the portable computing device applying the stimulus via the one other component upon the initial power-up, and the reading step comprises the portable computing device reading the response via the one other component from the interfaced hardware component.

5. The method according to claim 4, wherein the comparing step comprises the portable computing device comparing the read response against the associated response data.

6. The method according to claim 5, further comprising the steps of, after the identifying step, the portable computing device selecting a device driver for the interfaced hardware component in accordance with the correlation, and powering-up the interfaced hardware component in accordance with the selected device driver.

7. The method according to claim 6, wherein the possible hardware component comprises a LCD display, and the method further comprises the steps of, after the powering-up step, a technician visually comparing information displayed on the LCD display against an expected image, and the technician commanding the portable computing device to save in the computing device the identification of the interfaced hardware component in accordance with the visual comparison.

8. The method according to claim 7, wherein the table is provided in a memory of the portable computing device.

9. The method according to claim 8, wherein the portable computing device comprises a wireless handheld computing device.

10. A computer-readable medium including computer processing instructions for a processing unit of a portable computing device, and a table comprising stimulus and response data for possible hardware components that may be interfaced with the portable computing device, the computer processing instructions when executed by the processing unit causing the portable computing device to perform the following steps upon interfacing one of the possible hardware components with one other component of the computing device and initial power-up of the portable computing device:
  (1) applying a stimulus to the interfaced hardware component, and reading a response from the interfaced hardware component in response to the applied stimulus, the interfaced hardware component comprising a display device; and
  (2) identifying the interfaced hardware component from a correlation of the response with the stimulus/response data.

11. The computer-readable medium according to claim 10, wherein:
  the table includes a plurality of records, each said record being associated with a respective one of the possible hardware components and defining pin-out data and the stimulus and response data for the associated hardware component;
  the applying step comprises the steps of:
    (a) selecting one of the possible hardware components,
    (b) applying the stimulus in accordance with the pin-out and stimulus data associated with the selected one hardware component, and
    (c) reading the response in accordance with the pin-out information associated with the selected one hardware component; and
  the correlation step comprises comparing the read response against the response data associated with the selected hardware component.

12. The computer-readable medium according to claim 11, wherein the performing one other manufacturing step comprises performing the one other manufacturing step upon initial power-up of the portable computing device.

13. The computer-readable medium according to claim 12, wherein the step of applying the stimulus in accordance with the pin-out and stimulus data comprises the portable computing device applying the stimulus via the one other component upon the initial power-up, and the reading step comprises reading the response via the one other component from the interfaced hardware component.

14. A portable computing device comprising:
  a table comprising stimulus/response data for possible hardware components that may be interfaced with the computing device; and
  data processing means in communication with the table, the data processing means being configured for performing the following steps upon interfacing one of the possible hardware components with one other component of the computing device and initial power-up of the portable computing device:
    (1) applying a stimulus to the interfaced hardware component, and reading a response from the interfaced hardware component in response to the applied stimulus, the interfaced hardware component comprising a display device; and
    (2) identifying the interfaced hardware component from a correlation of the response with the stimulus/response data.

15. The portable computing device according to claim 14, wherein:
  the table includes a plurality of records, each said record being associated with a respective one of the possible hardware components and defining pin-out data and the stimulus and response data for the associated hardware component; the data processing means is configured to perform the applying step by:
    (a) selecting one of the possible hardware components,
    (b) applying the stimulus in accordance with the pin-out and stimulus data associated with the selected one hardware component, and
    (c) reading the response in accordance with the pin-out information associated with the selected one hardware component; and
  the data processing means is configured to perform the correlation step by comparing the read response against the response data associated with the selected hardware component.

16. The portable computing device according to claim 15, wherein the data processing means is configured to perform the step of applying the stimulus in accordance with the pin-out and stimulus data by applying the stimulus via the one other component upon the initial power-up, and the data processing means is configured to perform the reading step by reading the response via the one other component from the interfaced hardware component.

17. The portable computing device according to claim 16, wherein the data processing means is configured to perform the comparing step by comparing the read response against the associated response data.

18. The portable computing device according to claim 17, wherein the data processing means is further configured to perform the steps of, after the identifying step, selecting a device driver for the interfaced hardware component in accordance with the correlation, and powering-up the interfaced hardware component in accordance with the selected device driver.

19. The portable computing device according to claim 18, wherein the possible hardware component comprises a LCD display, and the data processing means is configured to save the identification of the interfaced hardware component in a memory of the portable computing device upon receipt of an external command.

20. The portable computing device according to claim 19, wherein the portable computing device comprises a wireless handheld computing device.

* * * * *